(12) United States Patent
Cheung

(10) Patent No.: US 7,036,426 B2
(45) Date of Patent: May 2, 2006

(54) ROTISSERIE OVEN

(76) Inventor: Chun Kong Ian Cheung, Flat 1, 2/F, Kai Fuk Industrial Centre, 1 Wang Tung Street, Kowloon Bay, Kowloon, Hong Kong (HK)

( * ) Notice: Subject to any disclaimer, the term of this patent is extended or adjusted under 35 U.S.C. 154(b) by 254 days.

(21) Appl. No.: 10/386,219

(22) Filed: Mar. 11, 2003

(65) Prior Publication Data
US 2003/0230200 A1 Dec. 18, 2003

Related U.S. Application Data

(63) Continuation-in-part of application No. 10/171,259, filed on Jun. 13, 2002, now Pat. No. 6,595,119.

(51) Int. Cl.
*A47J 37/04* (2006.01)
(52) U.S. Cl. ...................... 99/420; 99/421 H
(58) Field of Classification Search .................. 99/420, 99/421 H, 421 P, 427, 443 C
See application file for complete search history.

(56) References Cited

U.S. PATENT DOCUMENTS

| 504,256 | A | * | 8/1893 | Strong | 99/345 |
| 1,097,882 | A | * | 5/1914 | Saunders | 426/625 |
| 4,034,661 | A | * | 7/1977 | Boosalis et al. | 99/339 |
| 4,156,383 | A | * | 5/1979 | Maddox | 99/427 |
| 6,595,119 | B1 | * | 7/2003 | Cheung | 99/420 |

* cited by examiner

*Primary Examiner*—Reginald L. Alexander
(74) *Attorney, Agent, or Firm*—Jackson Walker, LLP

(57) ABSTRACT

A rotisserie oven includes a heat source, a continuous conveyor mounted adjacent the heat source, a number of attachment devices affixed along the conveyor, each for holding a food-supporting device adjacent the heat source while being conveyed by the conveyor. A turning device is attached to each attachment device for rotating each food-supporting device as it is conveyed past the heat source, and there is a detachment device adjacent the conveyor and cooperative with each attachment device to detach any food-supporting device attached thereto as the holding devices pass the detachment device in use.

17 Claims, 13 Drawing Sheets

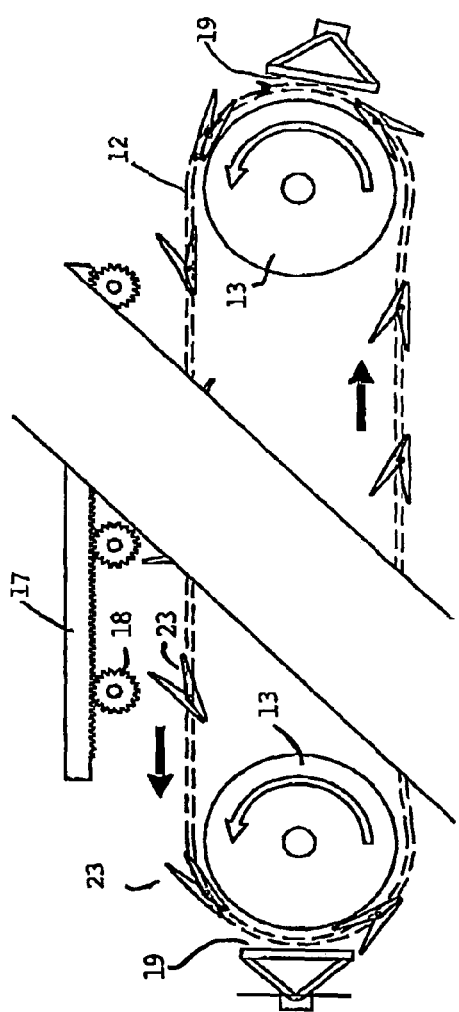
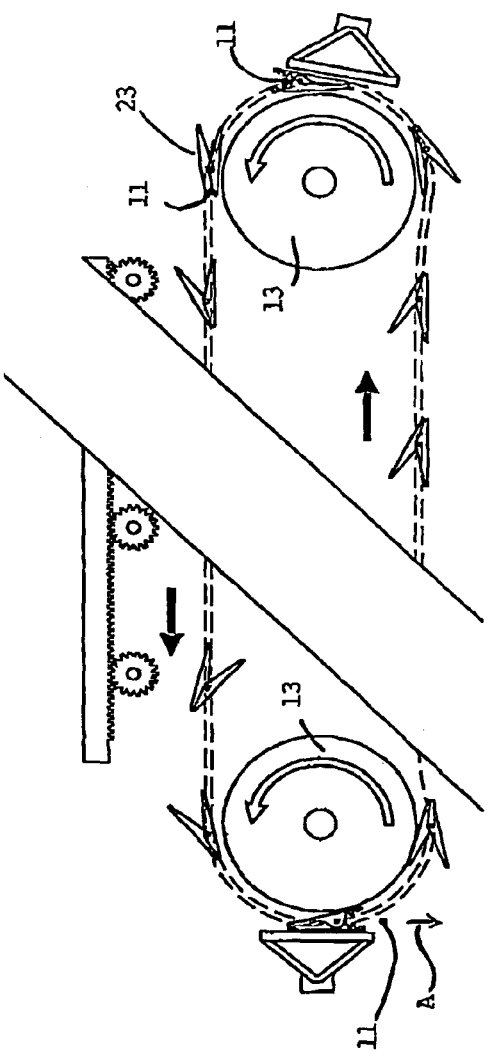
FIG. 2
FIG. 3

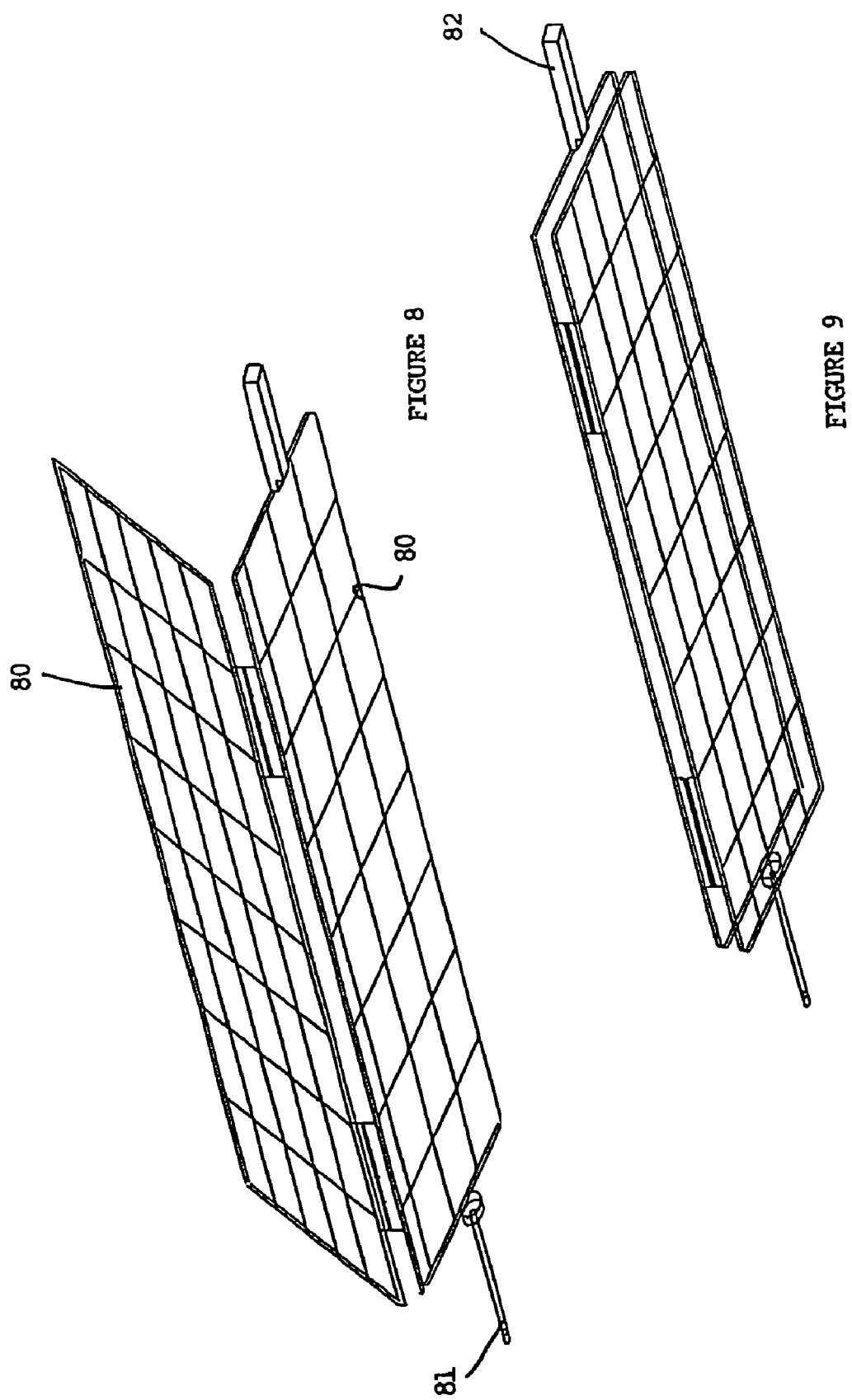

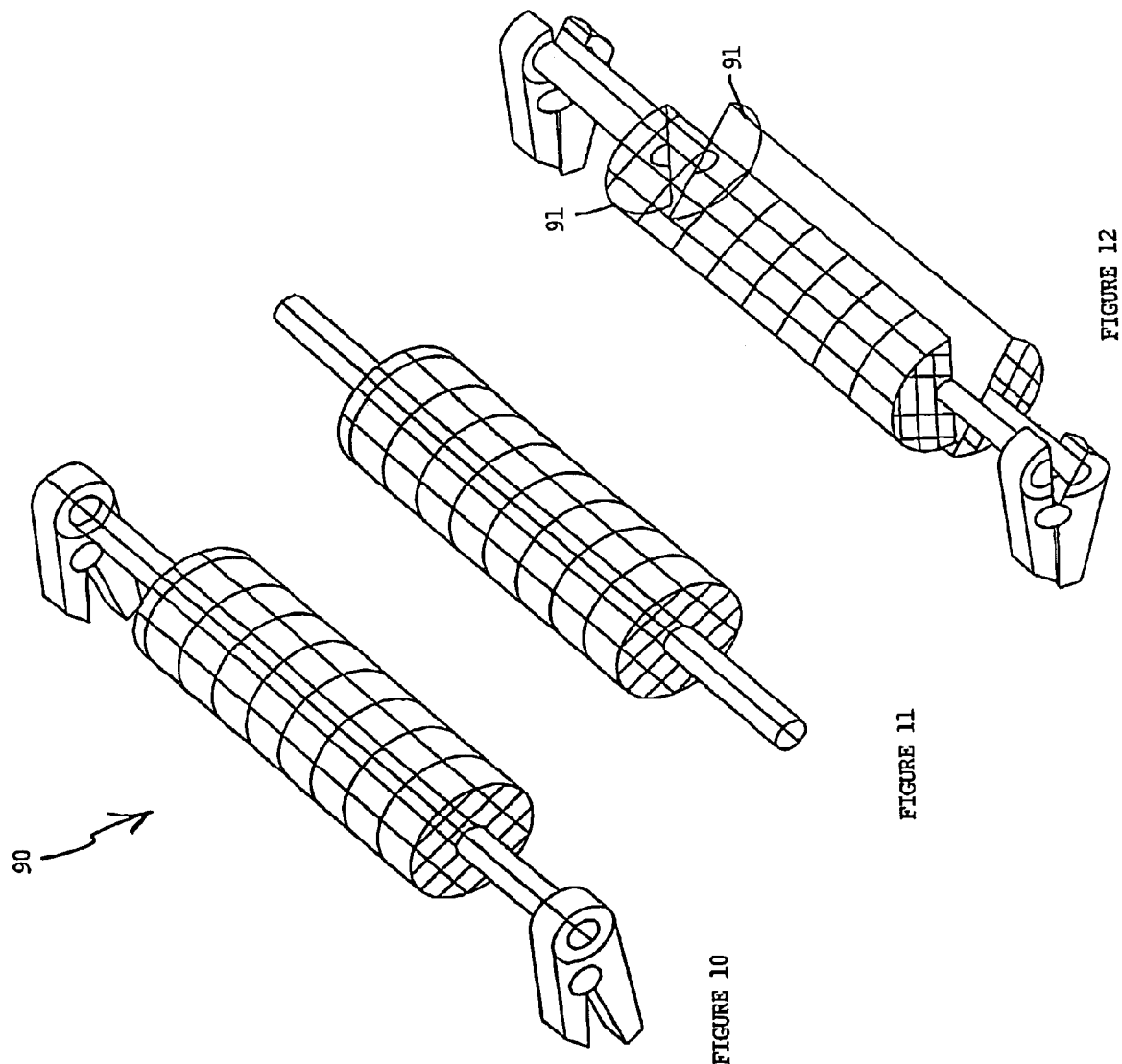

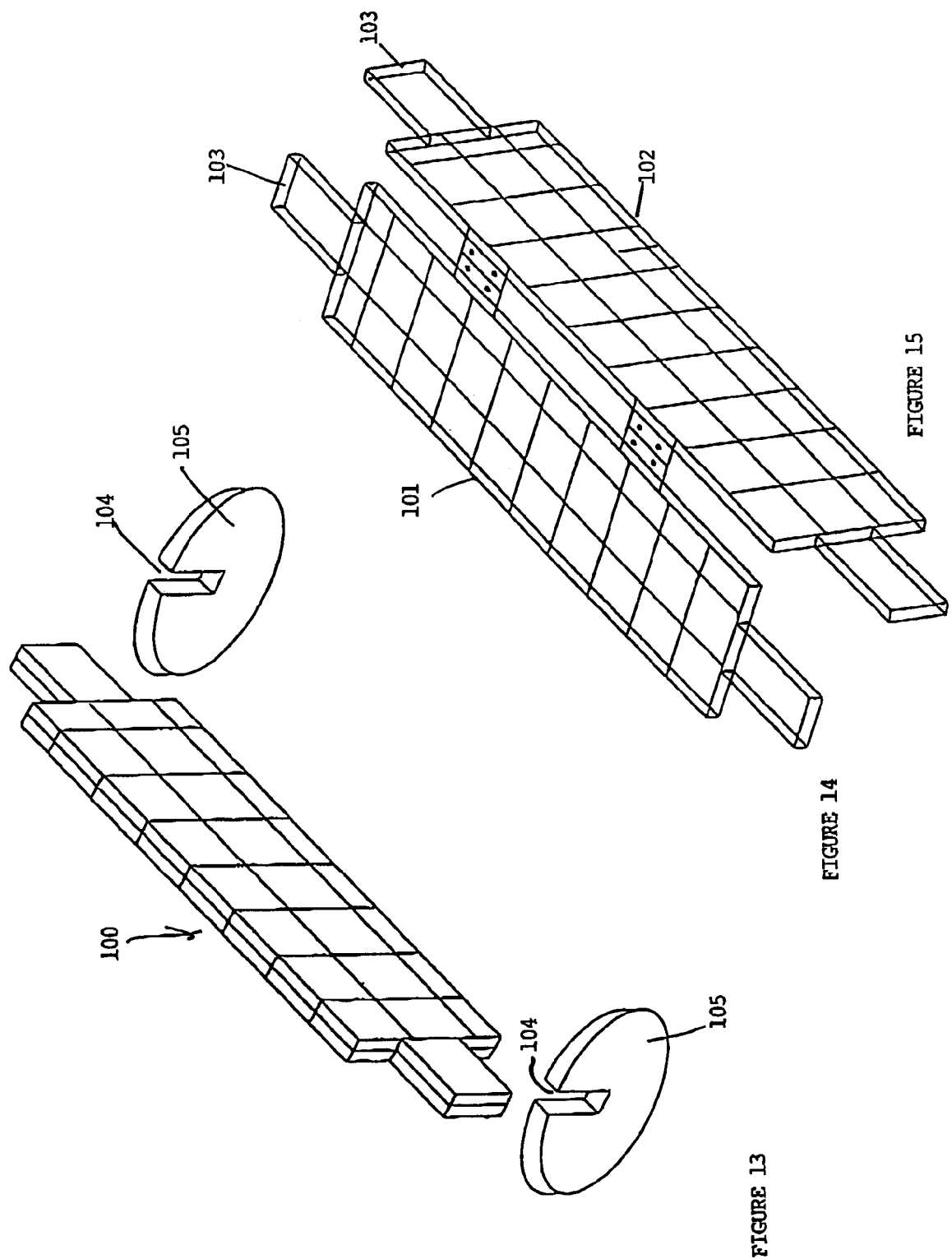

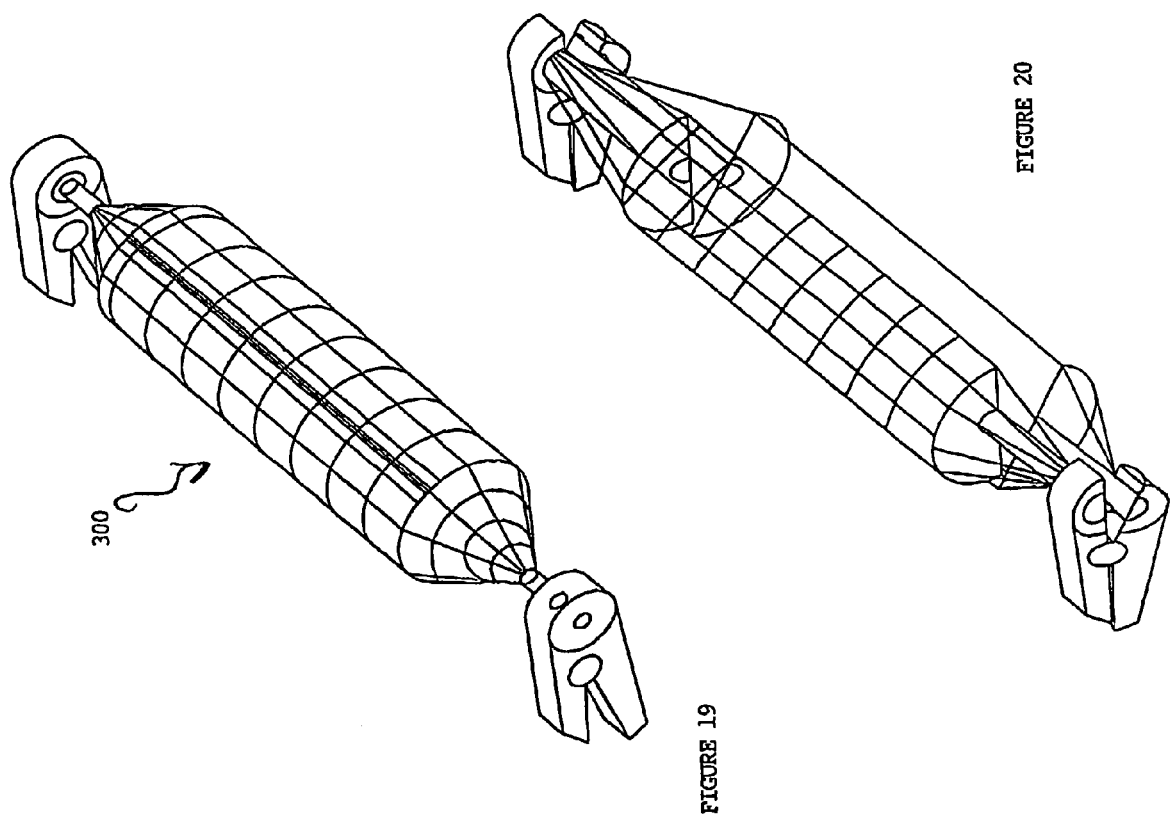

ROTISSERIE OVEN

This is a continuation-in-part of U.S. patent application Ser. No. 10/171,259, filed Jun. 13, 2002 now U.S. Pat. No. 6,595,119.

FIELD OF THE INVENTION

The following invention relates to a rotisserie oven. More particularly, although not exclusively, the invention relates to an oven for cooking rotating chicken pieces or other food items at a commercial food outlet.

It is known to cook food articles on a rotating skewer. Such skewers might be driven within an oven space or adjacent to a radiating heat source to rotate about a fixed axis. After a preset or estimated cooking time, the food article and/or skewer must be manually removed. If continued cooking occurs, the food article can dry out and lose its succulence. In fast food outlets, it is known to provide a chain conveyor-mounted array of horizontal skewers that circulate continuously past a radiating vertical heat source. Typically, whole chickens or chicken pieces are mounted on the skewers and rotate continuously around and past the heat source until they are removed individually to meet customer demand. In unexpected periods of low demand, the pieces continue to rotate past the heat source and tend to dry out, therefore losing their succulence and becoming unappetizing or even unpalatable.

Another problem associated with known rotisserie ovens is that the skewers themselves must be removed from the cooked food and cleaned after every use, or otherwise sold with the food item.

OBJECTS OF THE INVENTION

It is an object of the present invention to overcome or substantially ameliorate at least one of the above disadvantages.

It is another object of the present invention to provide a rotisserie oven for food articles, having improved throughput and providing cooked articles of good succulence and palatability.

It is another object of the present invention to provide a rotisserie oven in which special food holders instead of skewers are provided, which holders can be removed automatically from the oven when the food articles are cooked.

It is a further object of the present invention to provide a rotisserie oven that produces cooked food articles held within special food holders from which the cooked food articles are easily removed.

DISCLOSURE OF THE INVENTION

There is disclosed here in a rotisserie oven comprising:
a heat source,
a conveyor,
a plurality of attachment devices fixed to the conveyor and each holding a food-supporting device adjacent the heat source while being conveyed therepast by the conveyor,
a respective turning device attached to each attachment device for rotating each food-supporting device as it is conveyed past the heat source, and
a release mechanism adjacent the conveyor and cooperative with each food-supporting device to dispense food from the oven as the attachment devices pass the release mechanism in use.

Preferably the attachment devices each comprise a peg having two arms, a first arm being fixed to the conveyor and the second arm being pivotable with respect to the first arm.

Preferably, the oven further comprises a fixed bearing surface against which the attachment devices bear to allow attachment of a food-supporting device thereto.

Preferably the attachment devices each comprise a clamp activatable by a respective pusher that moves in a direction transverse to the extent of each conveyor, the pusher cooperating with a bearing surface at one end of the conveyor to detach a said food-supporting device.

Preferably the attachment devices each comprise a pair of counter rotationally biased discs each having a radial slot into which an end portion of the shaft is received, the biase rotating one disc relative to the other such that the edges of the slots clamp said end portion of the shaft.

Preferably said counter-rotational bias is effected by a coil spring connected to each disc.

Preferably one said disc has a pin engagable with a part of the oven to rotate that disc against the bias to thereby release said end portion of the food-supporting device therefrom.

Preferably the conveyor comprises a pair of parallel chains, each forming an endless loop.

Preferably the respective turning devices are pinion gears and the oven further comprises a fixed rack along which the pinion gears mesh to effect rotation thereof.

Alternatively, the conveyor comprises a pair of parallel plates between which the food-supporting devices are suspended, each plate being fixed upon a central shaft so as to rotate therewith.

In such an alternative, the respective turning devices are pinion gears mounted rotatably at a periphery of one of the plates and the oven further comprises a fixed gear about which the pinion gears mesh to effect rotation thereof.

Also, in such an alternative, the heat source is located in between the parallel plates.

Preferably the food-supporting devices are elongate and the oven further comprises a delivery device for delivering the food-supporting devices to the conveyor, the delivery device comprising a central support for supporting an array of said food-Supporting devices and a pair of driven moving bars flanking the central support and adapted upon rotation thereof to repeatedly lift the array of food-supporting devices off the central support and move them toward the conveyor.

Preferably the moving bars each comprise downwardly depending legs each attached pivotally to respective drive wheels.

Preferably each moving bar has a pair of said downwardly depending legs.

Preferably the oven further comprises a pair of driveshafts, each supporting a pair of said drive wheels.

Preferably each driveshaft is driven by a common motor.

There is further disclosed herein a food-supporting device for use with a rotisserie oven, the food-supporting device comprising an openable cage having a shaft extending therefrom for rotationally connecting the cage to an oven.

Preferably the cage comprises a pair of hingedly interconnected parts between which a food item can be constrained.

Preferably the shaft comprises a pair of interacting shaft portions, each extending from a respective interconnected part of the cage.

Preferably the interacting shaft portions are hemi-cylindrical.

Preferably the shaft has flat sides.

Preferably the interconnected parts are formed as metallic grates.

Preferably if the interconnected parts co-operate to define a cylinder.

There is further disclosed herein a combination comprising the above-disclosed rotisserie oven and one or a plurality of the above-disclosed food-supporting devices attached to a respective one of said attachment devices.

Alternatively, the food-supporting devices might be skewers.

BRIEF DESCRIPTION OF THE DRAWINGS

Preferred forms of the present invention will now be described by way of example with reference to the accompanying drawings wherein:

FIG. 2 is a schematic side elevational view of a conveyor portion of the oven of FIG. 1 in use;

FIG. 3 is another schematic side elevational view of a conveyor portion of the oven of FIG. 1 in use;

FIG. 8 is a schematic perspective illustration of a food holding device in an open configuration;

FIG. 9 is a schematic perspective illustration of the food holding device of FIG. 8 in a closed configuration;

FIGS. 10, 11 and 12 are schematic perspective illustrations of an alternative food holding device in various configurations;

FIGS. 13, 14 and 15 are schematic perspective illustrations of an alternative food holding device enclosed and open configurations respectively;

FIGS. 19 and 20 is a schematic prospective illustrations of yet a further alternative food holding device in closed and open configurations respectively;

DESCRIPTION OF THE PREFERRED EMBODIMENTS

Figure 1:
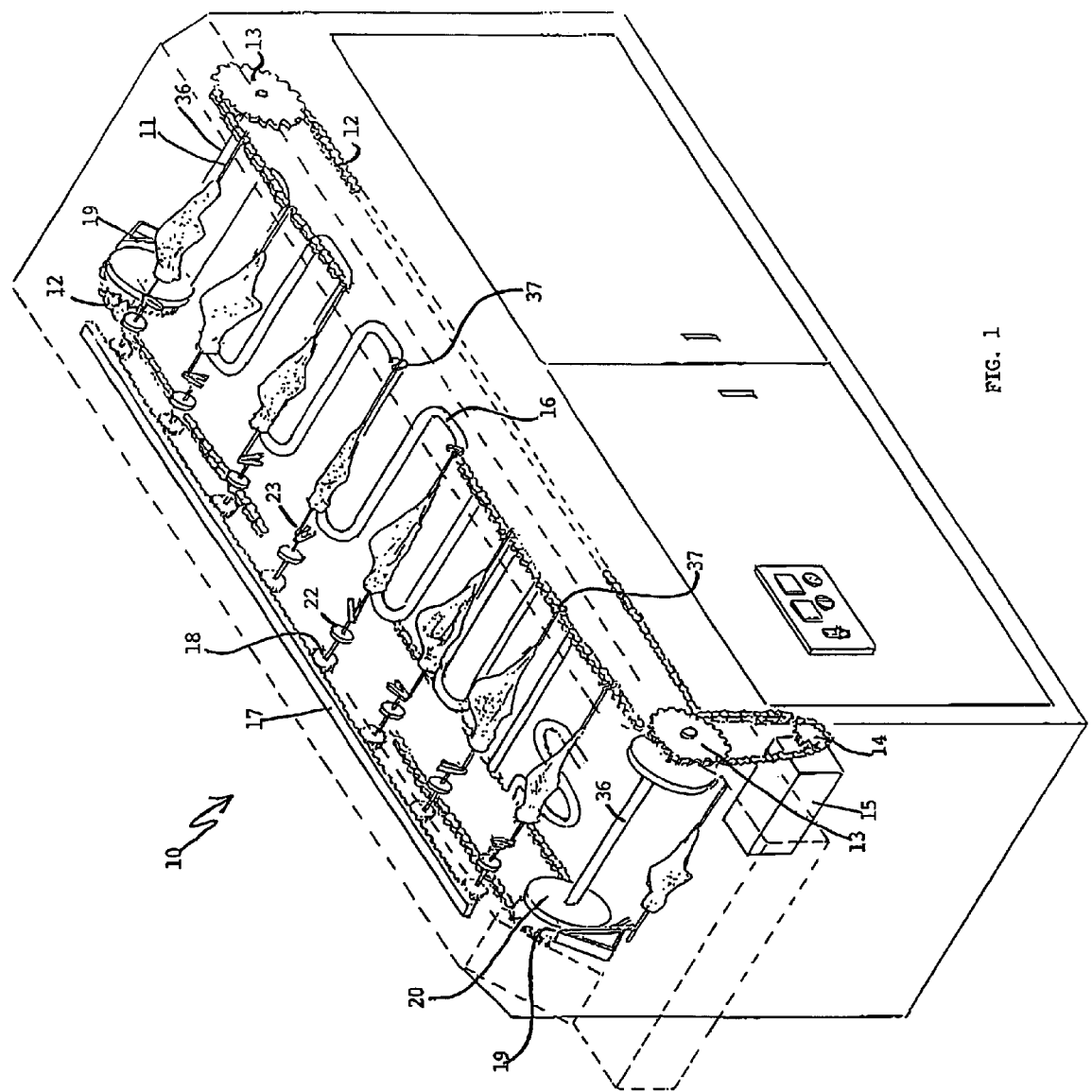
FIG. 1 is a schematic perspective view of a rotisserie oven.

In FIGS. 1 to 7 of the accompanying drawings there is schematically depicted a rotisserie oven 10. Rotisserie oven 10 works by conveying food items such as chicken wings on bamboo skewers 11 past a heat source such as heating element 16.

Each skewer 11 is temporarily affixed between a pair of endless conveyor chains 12. As heat energy radiates upwardly from the heat source, the food item or items upon each skewer 11 is/are cooked and any fat exuding therefrom can drip through/past the heating elements into a tray situated therebeneath.

Heating element 16 might be electrically powered. As an alternative, a gas flame or gas fired radiating grate might be provided.

Each of the conveyor chains 12 pass around respective end sprockets 13. That is, at each end of the oven, there is a pair of sprockets 13 connected to rotate in unison by a transverse shaft 36.

Attached at evenly spaced locations along one or both of the chains 12 are skewer holders 23. These are mounted upon rotational shafts, each shaft extending from a pinion gear 18. each pinion gear 18 cooperates with a longitudinal rack 17. That is, as the chain 12 moves, the skewer holders and pinions pass the rack. The pinions rotate due to their meshing interengagement with the rack 17.

The distal ends of the skewers are held in a V-shaped holder 37, many of which are attached to the opposite chain 12 at locations opposite each skewer holder 23. Gravity holds these ends of the skewers in the V-shaped holders 37.

Figure 4:
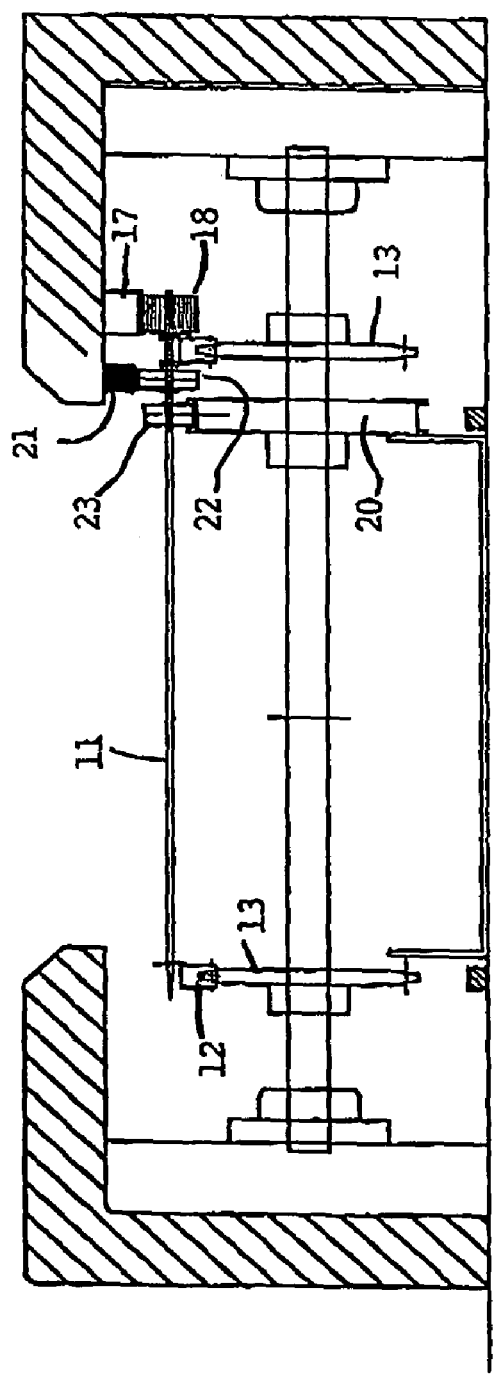
FIG. 4 is a schematic end elevational view of the conveyor portion of the oven of FIGS. 2 and 3.
Figure 5:
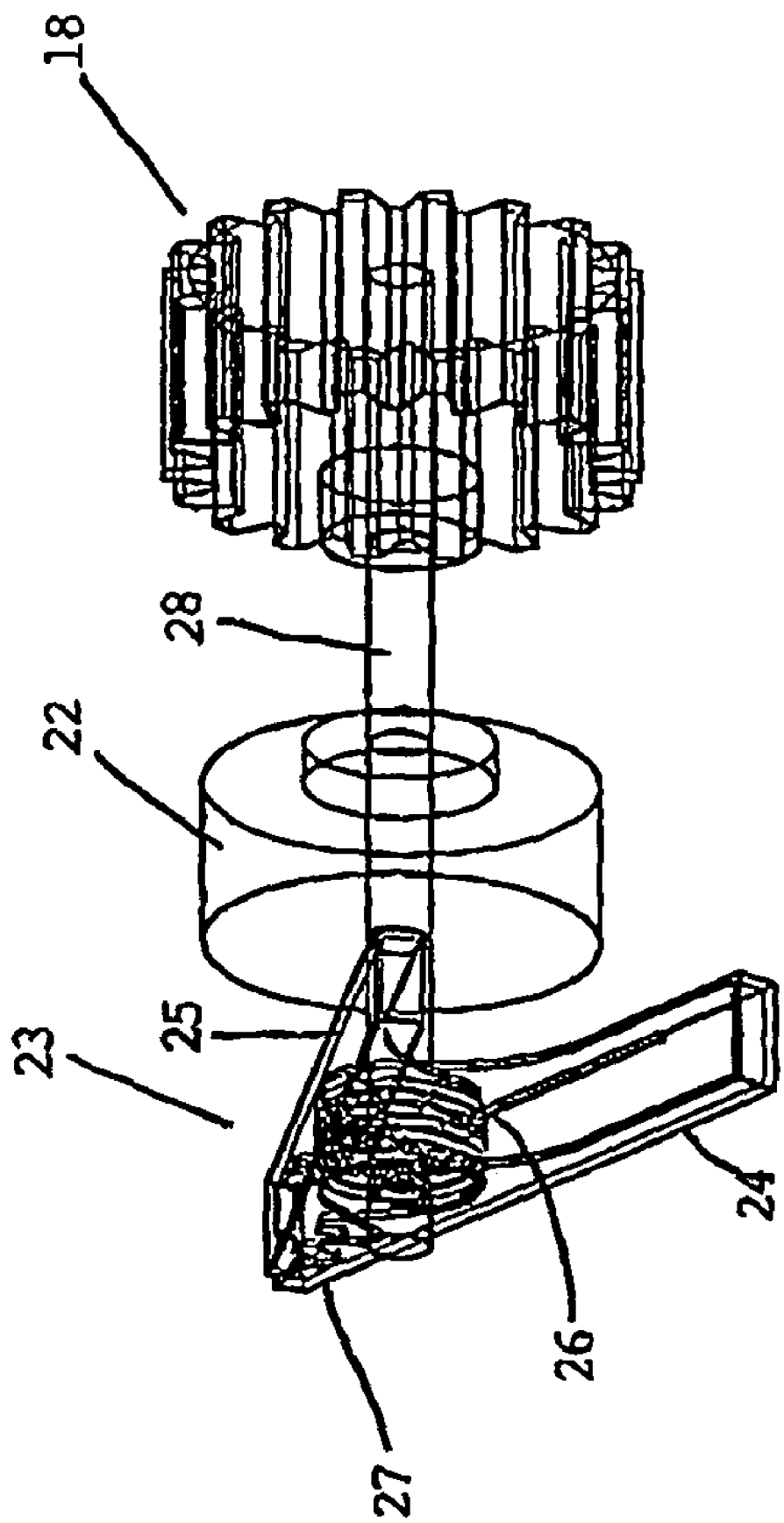
FIG. 5 is a schematic perspective view of a first type of skewer holder.
Figure 6:
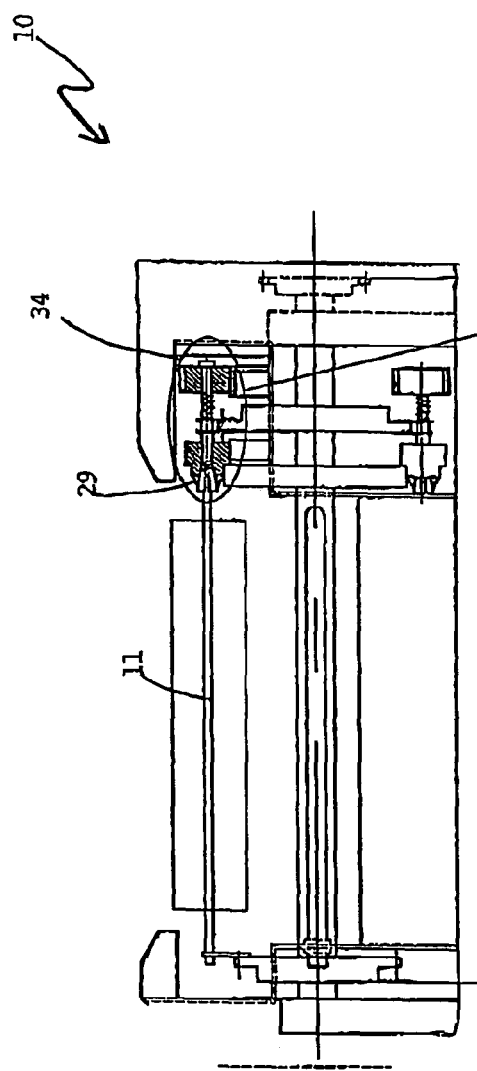
FIG. 6 is a Schematic end elevational view of a conveyor portion of an oven having a different type of skewer holder.

In FIGS. 2 and 3, the rack 17 and pinions 18 are schematically,shown separated from the chain 12. However, in reality, the skewer holders 23 and pinion 18 are upon a common horizontal shaft 28. The skewer holders 23 move in the direction indicated by the arrows in FIG. 2. In the depicted embodiment, and as better illustrated in FIG. 5, each skewer holder is formed somewhat like a clothes peg including first and second arms 24 and 25 biassed into a closed, clasping position by an internal coil spring 26. A skewer recess 27 is provided between the closed or grasping ends of the respective arms and it is from this recess that a skewer extends. As seen in FIG. 5, the skewer holder 23 and pinion 18 are mounted upon the common shaft 28 in fixed relationship so as to both rotate in unison. Also mounted upon the shaft 28 is a roller 22 which, as shown in FIG. 4, rides against a track 21 so as to maintain the horizontal nature of the shaft 28 in use.

Referring again to FIG. 2, there is provided at each end of the conveyor, a respective bearing surface 19 against which the second arms 25 of the skewer holders 25 interact. At the right hand end of FIG. 2 (the pick-up end), the skewer holders 23 open as a result of interaction of the second arm 25 with the bearing surface 19 to cause the skewer holder to open and enable the recess 27 to close about an end portion of a skewer 11. As conveyed slowly from right to left in FIG. 2, any food item mounted on a skewer will be cooked. That is, the conveyor is driven slowly such that the cooking time coincides with the time that it takes to convoy the skewer between the respective sprockets in one pass only.

At the left hand end (the delivery end) of the oven shown in FIG. 2, the other bearing surface 19 interacts with the second arm 25 to disengage a skewer 11 so that it falls out in a direction indicated by arrow A in FIG. 3. A food receiving receptacle or tray (not shown) can be provided underneath arrow A.

As can be seen, the skewer holders 23 rotate due to the interaction of pinions 18 with rack 17. This rotation ensures even cooking of the food articles that are mounted on the skewers. In this embodiment, it is important that the chain 12 be carefully mounted to the sprockets 13 to ensure that the skewer holders approach and interact with the bearing surfaces 19 for proper operation. If the chain is incorrectly mounted upon the sprocket, the skewer holders might approach the bearing surfaces 19 in a skew or reverse orientation in which case jamming might occur. This is addressed in the embodiment of FIGS. 6. and 7 in which a different type of skewer holder or clamp 29 is provided. In this embodiment, a clamp 29 is activated in a direction parallel to the extent of each skewer 11. The clamp 29 is activated by a push rod 31 also moving in a direction parallel to the extent of the skewer. The push rod is activated by an activator 32 having a follower surface 33. Surface 33 bears against a fixed cam surface 34 as it moves therepast. A buffer spring 35 is situated between the activator 32 and the push rod 31 return the push rod 31 to its rest position.

The clamp 29 includes springs 30 to maintain the clamp in a closed position against the end portion of skewer 11. Again, a cam surface is provided at both ends of the conveyor to activate clamp 29 in a similar manner as bearing surfaces 19 are provided in the first embodiment.

The skewers 11 are preferably single-use bamboo skewers to be sold with the food pieces to customers. The food pieces might typically be chicken wings which can be eaten by the customer directly off the skewer whereupon the skewer can be discarded, recycled or otherwise used.

Instead of using skewers, different types of food holding devices can be used. Alternative food holding cages are depicted in the remaining figures.

In the embodiments of FIGS. 8 and 9, the food holding device comprises a pair of hingedly interconnected grates 80. From one of the grates then extends an axle 81. From the other end of that great there extends a shaft 82 of rectangular cross-section.

In FIGS. 10 and 12 there is depicted a food holding device 90 comprising a pair of hemi-cylindrical cage halves 91. From opposed ends of each cave half, there extends a hemi-cylindrical shaft portion, each of which co-operate to define a cylindrical shaft when the cage halves are closed. FIG. 11 depicts a food holding cage that is attachable to machine-mounted pegs, whereas FIGS. 10 and 12 show a cage having integrate pegs.

In FIGS. 13 and 15, a food holding device 100 is depicted having a pair of flat grates at respective opposed ends of which there extends a flat tab 103. These tabs co-operate with one another and fit within a slot 100 and for provided in a disc 105. The discs 105 an attachment device comprising part of a rotisserie oven.

Figure 16:
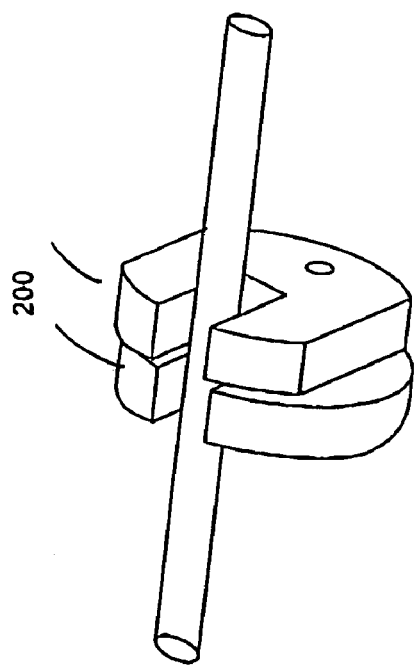
FIG. 16 is a schematic perspective illustration of a portion of a food holding device interacting with an attachment device.
Figure 17:
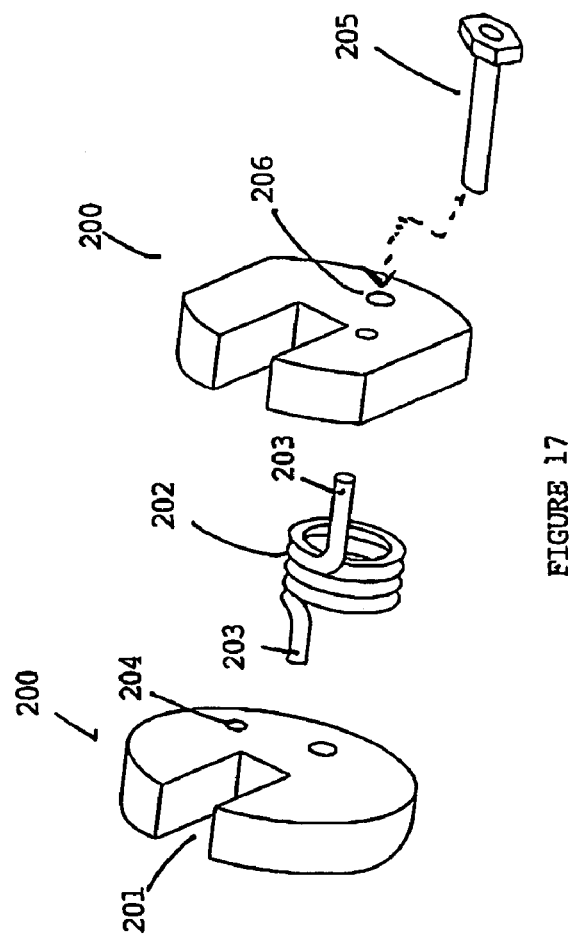
FIG. 17 is a schematic parts-exploded perspective illustration of the attachment device shown in FIG. 16.

An alternative disc device is depicted in FIGS. 16 and 17. In this embodiment, there are two disc parts 200, each comprising a slot 201. There is a coil springs 202 having ends 203 received within respective holes 204 formed in the discs 200. A pin 205 extends from a whole 206 in one of the discs 200.

Figure 18:
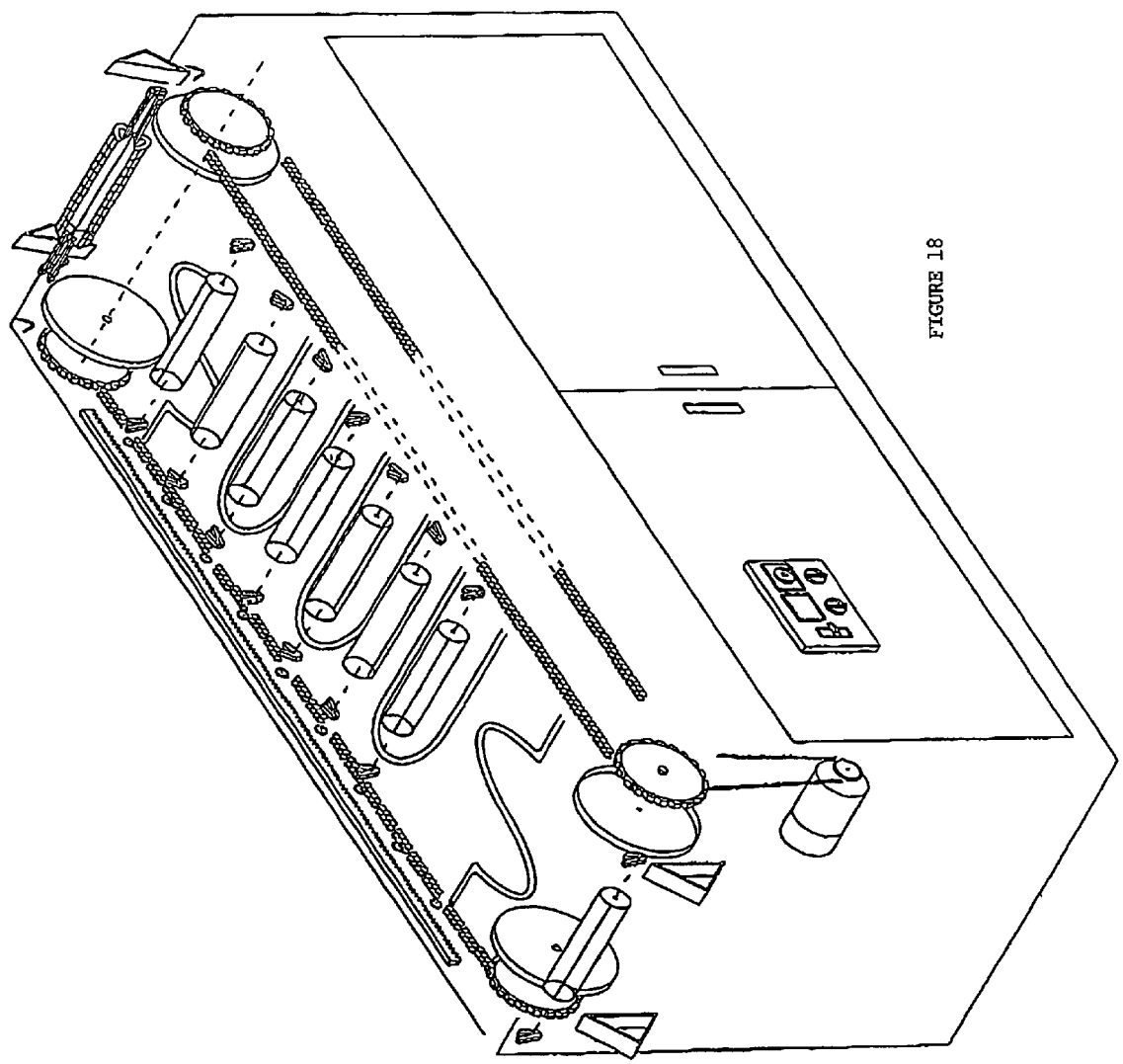
FIG. 18 is a schematic perspective illustration of an oven having attached thereto a plurality of food holders of the type depicted in FIGS. 10 to 12.

In FIG. 18, there is shown a rotisserie oven that is the same in structure and configuration as the oven discussed earlier. However, in this oven a plurality of food holding devices of the type depicted in FIGS. 10 to 12 are shown. Equally, the food holding devices of anyone of the remaining figures can be used with the oven.

FIGS. 19 and 20 show yet an alternative food holding device 300, being the same as the device depicted in FIGS. 10 to 12, but having conical end portions.

Each of the food holding devices depicted in FIGS. 8, 9 and 13 to 20 are typically fabricated from stainless steel wire. Food items can be sandwiched or otherwise housed between the respective cage halves and barbecued by the other.

The shaft that extends from one end of each cage can be received within the rotating disc conveyed by the conveyor chain of the oven to effect rotation of the cage. In order to firmly secure the shaft, the counter-biased discs 200 of FIGS. 16 and 17 can be used to "bite" the shaft. The coil springs 202 provides the necessary biasing falls. The pin 205 extending from one of the discs 200 can engage with a fixed part of the other in the delivery and their of two bear against the bias of the spring 202 to do thereby twist one disc with respect to the other to release the shaft and thereby release the food holder.

Figure 21:
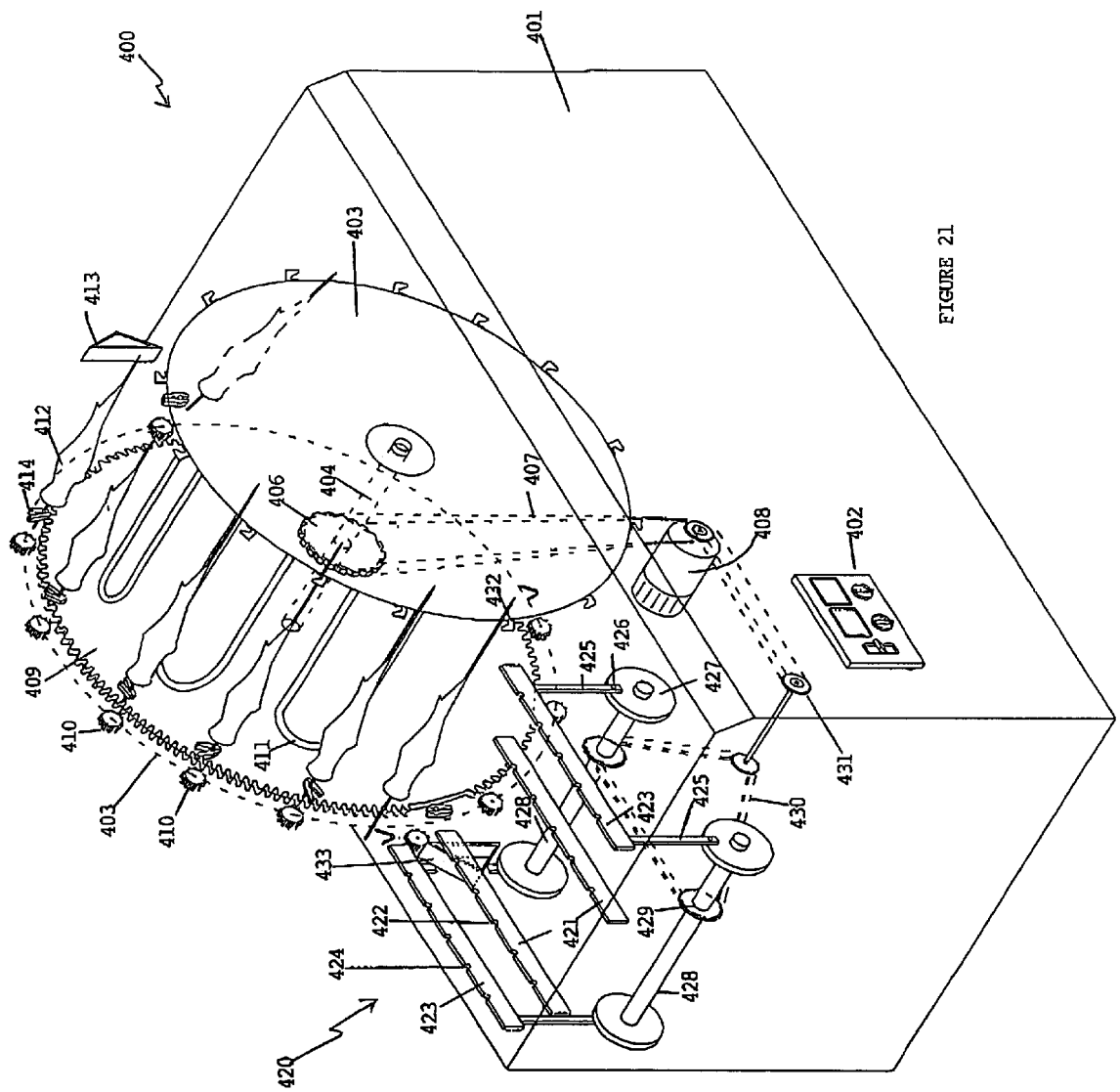
FIG. 21 is a schematic perspective illustration of a further rotisserie oven.
Figure 23:
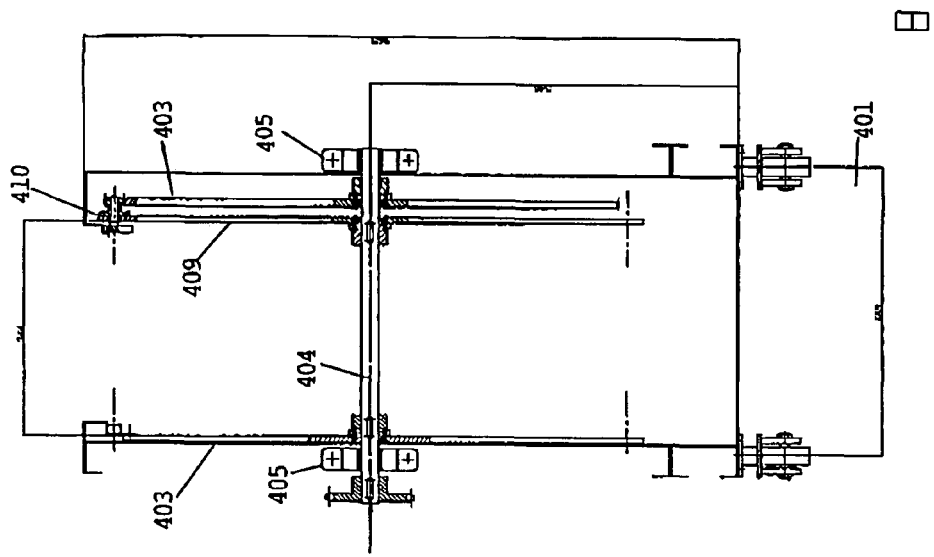
FIG. 23 is a schematic cross-sectional end elevational view of the oven of FIGS. 21 and 22.
Figure 22:
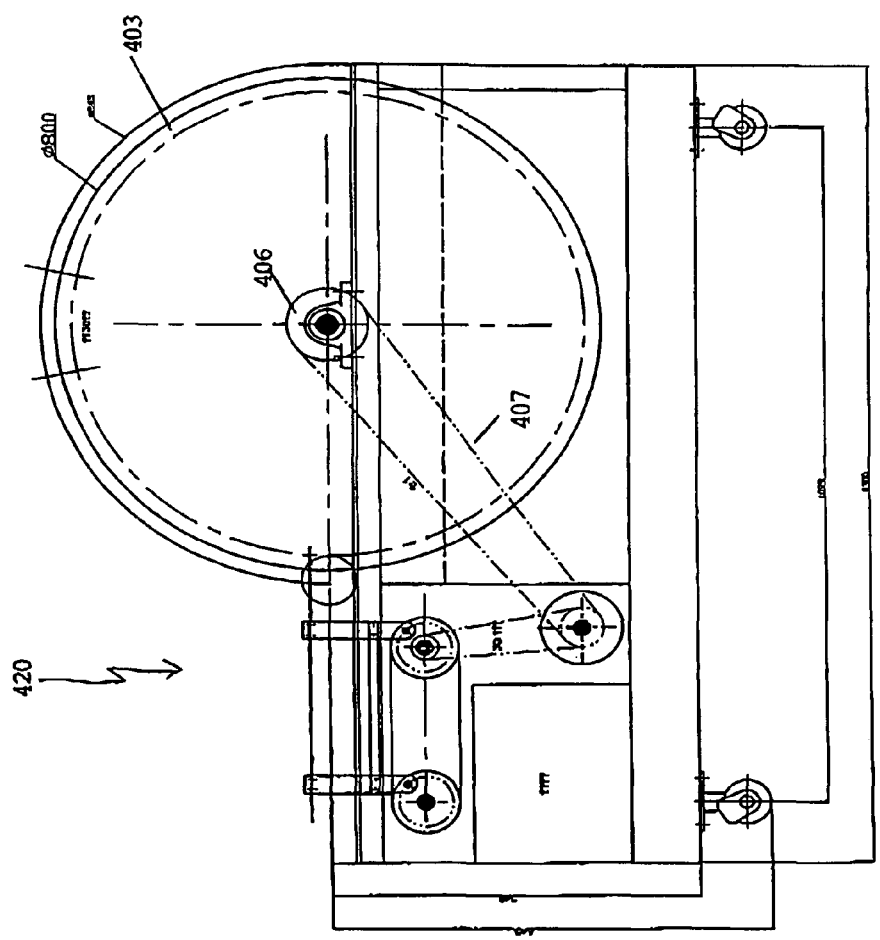
FIG. 22 is a schematic side elevational view of the rotisserie oven of FIG. 21.

In FIGS. 21 to 23 of the accompanying drawings there is depicted schematically an alternative rotisserie oven 400. Oven 400 comprises a base 401 having a control panel 402. Mounted rotatably with respect to the base 401 is a pair of plates 403. Each plate 403 is fixed to a shaft 404 and for. The shaft 404 is mounted rotatably to the base 401 by bearings 405 at its opposed ends. The shaft 404 has fixed to its centre a drive sprocket 406. A chain or belt 407 connects the sprocket 406 to the output of an electric motor 408. Upon activation of the motor 408 the parallel plates 403 rotate in unison with the shaft 404.

There is a large fixed gear 409 located inboard of one of the plates 403. This plate has pinion gears 410 rotatably mounted thereto about its periphery.

Figure 7:
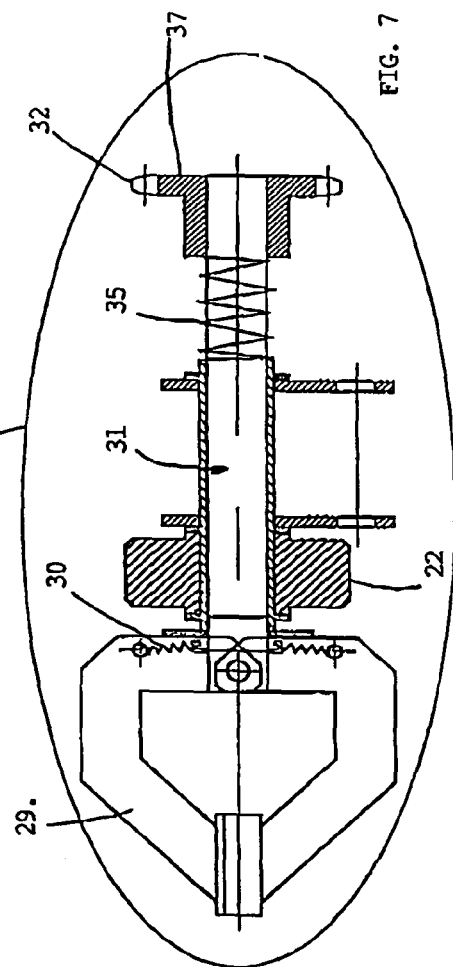
FIG. 7 is a schematic elevational view of the different skewer holder of FIG. 6.

Each pinion gear has components associated with it the same as those depicted in FIG. 5 or FIG. 7 and serve to convey mounted food items 412 supported by a skewer or food cage for example as depicted in the preceding Figures.

There is an electric heating element or elements 411 in between the parallel plates 403 and past which the food items 412 are conveyed in rotational manner by interaction of the pinions 410 with teeth of the large gear 409.

There is a food detachment device 413 against which the pegs 414 bear to dispense the skewered or caged food items 412 after cooking.

There is a food-delivery apparatus 420 at the input side of the rotisserie oven 400. This comprises a pair of inboard rails 421 in fixed location. The inboard rails have a number of notches 422 across which the skewers or food cages extend. There is a pair of outboard rails 423 flanking the inboard rails 421. The outboard rails 423 comprise notches 424 for supporting respective end portions of the skewers or food cages. Each outboard rail has a pair of fixed legs 425 depending therefrom. The bottom end of each leg is attached pivotally at 426 to a wheel 427. There are two shafts 428 extending transversely beneath the rails, at opposed ends of which the wheels 427 are fixed. The shafts 428 each have a sprocket 429 driven by a chain or belt 430. There is a drive transmission 431 extending from the motor 408 to effect rotation of the chain or belt 430. Upon rotation of the shafts 428 the wheels 427 rotate to effect rotary oscillation of the outboard rails 423 in a clockwise direction. As a result, the skewers or cages are lifted from the notches 422 of the inboard rails and shifted forward toward the rotisserie oven whereupon outer end portions of the skewers or cages are picked up by one of a plurality of hooks 432 affixed about the periphery of each plate 403. The bottom of the There is an attachment device 433 having a surface to co-operate with the pegs 414 in the same manner as surface 19 described with reference to FIG. 2.

It should be appreciated that modifications and alternations obvious to those skilled in the art are not to be considered as beyond the scope of the present invention. For example, rather than providing a horizontally orientated heating source, the heat radiator might be vertical or inclined and the conveyor might convey the food pieces in a vertical or inclined plane, rather than the horizontal plane of the described embodiments. Also, rather than providing a rack and pinion arrangement, the skewers might be turned by a chain and sprocket arrangement, that is, the rack could be replaced by a chain and the pinions could be replaced by sprockets.

Furthermore, in the embodiments depicted in FIGS. 13 to 20, instead of completely releasing the food holding devices at the delivery and of the rotisserie other, apparatus could be provided to simply open the food cage halves to release a cooked food item therein.

The invention claimed is:

1. A rotisserie oven comprising:
   a heat source,
   a conveyor,
   a plurality of attachment devices fixed to the conveyor and each holding a food-supporting device adjacent the heat source while being conveyed therepast by the conveyor, the attachment devices each comprise a peg having two arms, a first arm being fixed to the conveyor and the second arm being pivotable with respect to the first arm,
   a respective turning device attached to each attachment device for rotating each food-supporting device as it is conveyed past the heat source, and
   a release mechanism adjacent the conveyor and cooperative with each food-supporting device to dispense food from the oven as the attachment devices pass the release mechanism in use.

2. The oven of claim 1, further comprising a fixed bearing surface against which the attachment devices bear to allow attachment of a food-supporting device thereto.

3. The oven of claim 1, wherein the conveyor comprises a pair of parallel chains, each forming an endless loop.

4. The oven of claim 1, wherein the respective turning devices are pinion gears and the oven further comprises a fixed rack along which the pinion gears mesh to effect rotation thereof.

5. The oven of claim 1, wherein the conveyor comprises a pair of parallel plates between which the food-supporting devices are suspended, each plate being fixed upon a central shaft so as to rotate therewith.

6. The oven of claim 5, wherein the respective turning devices are pinion gears mounted rotatably at a periphery of one of the plates and the oven further comprises a fixed gear about which the pinion gears mesh to effect rotation thereof.

7. The oven of claim 5 wherein the heat source is located in between the parallel plates.

8. The oven of claim 1 further comprising a delivery device for delivering the food-supporting devices to the conveyor, the delivery device comprising a central support for supporting an array of said food-supporting devices and a pair of driven moving bars flanking the central support and adapted upon rotation thereof to repeatedly lift the array of food-supporting devices off the central support and move them toward the conveyor.

9. The oven of claim 8 wherein the moving bars each comprise downwardly depending legs each attached pivotally to respective drive wheels.

10. The oven of claim 9 wherein each moving bar has a pair of said downwardly depending legs.

11. The oven of claim 10 comprising a pair of driveshafts, each supporting a pair of said drive wheels.

12. The oven of claim 11 wherein the food-supporting devices are skewers.

13. The oven of claim 1 wherein the food-supporting devices are skewers.

14. A rotisserie oven comprising:
   a heat source,
   a conveyor,
   a plurality of attachment devices fixed to the conveyor and each holding a food-supporting device adjacent the heat source while being conveyed therepast by the conveyor,
   a respective turning device attached to each attachment device for rotating each food-supporting device as it is conveyed past the heat source,
   a release mechanism adjacent the conveyor and cooperative with each food-supporting device to dispense food from the oven as the attachment devices pass the release mechanism in use,
   wherein the attachment devices each comprise a clamp activatable by a respective pusher that moves in a direction transverse to the extent of conveyor, the pusher cooperating with a bearing surface at one end of the conveyor to attach a said food-supporting device.

15. A rotisserie oven comprising:
   a heat source,
   a conveyor,
   a plurality of attachment devices fixed to the conveyor and each holding a food-supporting device adjacent the heat source while being conveyed therepast by the conveyor,
   a respective turning device attached to each attachment device for rotating each food-supporting device as it is conveyed past the heat source,
   a release mechanism adjacent the conveyor and cooperative with each food-supporting device to dispense food from the oven as the attachment devices pass the release mechanism in use,
   wherein the attachment devices each comprise a clamp activatable by a respective pusher that moves in a direction transverse to the extent of conveyor, the pusher cooperating with a bearing surface at one end of the conveyor to attach a said food-supporting device,
   wherein the attachment devices each comprise a pair of counter rotationally biased discs each having a radial slot into which an end portion of the food-supporting devices is received, the biased rotating one disc relative to the other such that the edges of the slots clamp said end portion of the shaft.

16. The oven of claim 15, wherein said counter-rotational bias is effected by a coil spring connected to each disc.

17. The oven of claim 16, wherein one said disc has a pin engagable with a part of the oven to rotate that disc against the bias to thereby release said end portion of the food-supporting device therefrom.

* * * * *